United States Patent
Lai et al.

(10) Patent No.: US 11,629,282 B2
(45) Date of Patent: Apr. 18, 2023

(54) SALT-TOLERANT POLYMER MICROSPHERE PLUGGING AGENT AND PREPARATION METHOD THEREOF

(71) Applicant: Shaanxi University of Science & Technology, Xi'an (CN)

(72) Inventors: Xiaojuan Lai, Xi'an (CN); Guiru Liu, Xi'an (CN); Lei Wang, Xi'an (CN); Jinhao Gao, Xi'an (CN); Xiaohu Liu, Xi'an (CN); Zhiqiang Dang, Xi'an (CN); Chu Mi, Xi'an (CN); Jun Yin, Xi'an (CN)

(73) Assignee: Shaanxi University of Science & Technology, Xi'an (CN)

( * ) Notice: Subject to any disclaimer, the term of this patent is extended or adjusted under 35 U.S.C. 154(b) by 0 days.

(21) Appl. No.: 17/400,430

(22) Filed: Aug. 12, 2021

(65) Prior Publication Data

US 2023/0050157 A1    Feb. 16, 2023

(51) Int. Cl.
*C09K 8/76*    (2006.01)
*C09K 8/42*    (2006.01)

(52) U.S. Cl.
CPC .................... *C09K 8/426* (2013.01)

(58) Field of Classification Search
CPC ........ C09K 8/035; C09K 8/032; C09K 8/487; C09K 8/467; C09K 8/426
See application file for complete search history.

(56) References Cited

FOREIGN PATENT DOCUMENTS

| CN | 104231168 A | * 12/2014 | |
|---|---|---|---|
| CN | 112851856 A | * 5/2021 | |
| WO | WO-2018028365 A1 | * 2/2018 | ............ C08F 220/28 |

OTHER PUBLICATIONS https://www.sigmaaldrich.cn/CN/en/product/sial/p1754, Retrieved on Oct. 13, 2022.
https://baike.baidu.com/item/tx-10/11039550?fr=aladdin, Retrieved on Oct. 13, 2022.
https://www.chemsrc.com/cas/9041-29-6_1542898.html#ebiemingDiv, Retrieved on Oct. 13, 2022.
https://www.chemicalbook.com/ProductChemicalPropertiesCB1875601.htm, Retrieved on Oct. 13, 2022.
https://www.chemicalbook.com/ProductChemicalPropertiesCB2138639.htm, Retrieved on Oct. 13, 2022.
https://www.chemicalbook.com/ProductMSDSDetailCB2783774_EN.htm, Retrieved on Oct. 13, 2022.
https://www.chemicalbook.com/ProductMSDSDetailCB0419567_EN.htm, Retrieved on Oct. 13, 2022.

* cited by examiner

*Primary Examiner* — Kumar R Bhushan
(74) *Attorney, Agent, or Firm* — Tutunjian & Bitetto, P.C.

(57) ABSTRACT

A salt-tolerant polymer microsphere plugging agent and a preparation method thereof, the agent being made of white oil, fumed silica, acrylamide monomer, acrylic acid, sorbitan fatty acid ester, N,N'-methylene bisacrylamide, ammonium persulfate, sodium bisulfite, hydrophilic surfactant and water. The present general inventive concept synthesizes salt-tolerant polymer microspheres with ultra-low interfacial tension by adopting inverse phase emulsion polymerization. The prepared polymer microsphere plugging agent is a new type of polymer microspheres with ultra-low interfacial tension, such that the tension can reach $4.3 \times 10^{-3}$ mN/m, and the salt tolerance can reach 50000 mg/L salinity, which improves the problem of low interfacial tension and poor salt tolerance in existing polymer microspheres.

5 Claims, 5 Drawing Sheets

SALT-TOLERANT POLYMER MICROSPHERE PLUGGING AGENT AND PREPARATION METHOD THEREOF

BACKGROUND

1. Field

The present general inventive concept relates generally to the field of oilfield mining chemicals, and particularly, to a salt-tolerant polymer microsphere plugging agent with ultra-low interfacial tension, and a preparation method thereof.

2. Related Art

Polyacrylamide microspheres are a class of useful water-absorbent resins, which are applied to deep profile control and water plugging in oilfields, mainly for deep profile control in oilfields with strong heterogeneity, high water content, and large pores. This deep profile control and water plugging in oilfields is a relatively new technology developed to rectify the negative effects of water flooding.

In related art, Chinese patent application number CN1888374A discloses a water plugging method with high temperature resistance and high salt tolerance, which utilizes three-plunger injection water plugging methods, such that a first slug is added with a plugging agent, accounting for 10-20% of the total amount of injection, and after the plugging agent is injected for 0.5-1.5 hours, the well is shut-in for waiting on cement setting, causing the plugging agent to gel and temporarily plug the oil layer.

Further, a second slug that is subsequently injected has characteristics of low viscosity, easy injection, and high viscoelastic gel formation at the formation temperature, and the applicable temperature range is 90-280° C., accounting for 70-80% of the total amount of injection.

A third slug is cement, which is used as a sealing agent to increase the strength of the main slug, accounting for 10-20% of the total amount of injection. However, the results of this process will gel in the oil layer, which will reduce the relative permeability of the oil phase.

Another related art, namely Chinese patent application CN103073679A, prepares a polyacrylamide microsphere water plugging agent, including weighing raw material acrylamide, salt-tolerant monomer, N,N'-methylene bisacrylamide, Span-80, potassium persulfate, cyclohexane and deionized water, stirring the mixed dispersant and cyclohexane in the polymerization monomer, and initiating and polymerizing to form a water plugging agent. However, Cyclohexane is used as the continuous phase, which has a high cost, and it is stratified after standing. As a result, the stability is not good and the salt tolerance is only 30,000 mg/L salinity.

The existing related literature, conventional art, and patents have not found a salt-tolerant polymer microsphere plugging agent with ultra-low interfacial tension and a preparation method thereof.

SUMMARY

In order to solve the defects of interfacial tension and salt tolerance of the plugging agent in the related art, the present general inventive concept provides a salt-tolerant polymer microsphere plugging agent, and a preparation method thereof, and furthermore, the polymer microsphere plugging agent may have a simple construction, good stability, ultra-low interfacial tension, and higher salt tolerance.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a salt-tolerant polymer microsphere plugging agent, which may be prepared from raw materials in percentage by weight, including, 20-40 wt % of white oil, 0.5-2 wt % of fumed silica, 10-25 wt % of an acrylamide monomer, 5-15 wt % of acrylic acid, 5-15 wt % of sorbitan fatty acid ester, 0.03-0.08 wt % of N,N'-methylene bisacrylamide, 0.01-0.05 wt % of ammonium persulfate, 0.01-0.08 wt % of sodium bisulfite, 10-25 wt % of a hydrophilic surfactant, and water in balance.

As a further improvement of the present general inventive concept, the hydrophilic surfactant may be one or more of Tween-80, TX-10, OP-10, and SAS 60.

As a further improvement of the present general inventive concept, the sorbitan fatty acid may be is one or more of Span-40, Span-60, and Span-80.

As a further improvement of the present general inventive concept, the water may include tap water or deionized water.

As a further improvement of the present general inventive concept, the white oil may be industrial grade.

The foregoing and/or other features and utilities of the present general inventive concept may also be achieved by providing a method of preparing the salt-tolerant polymer microsphere plugging agent, including weighing the raw material according to weight ratio, under room temperature, adding white oil, fumed silica, sorbitan fatty acid ester, the hydrophilic surfactant to a container equipped with a stirrer, a thermometer, and a reflux condenser, and stirring uniformly to make a solution A, adding the weighed acrylamide monomer, acrylic acid, N,N'-methylene bisacrylamide into water, stirring to dissolve completely, adding an alkali liquor to neutralize, then adding sodium bisulfite, stirring to dissolve completely to make a solution B, and the mass ratio of solution A to solution B is (1-4):1, and adding solution B to solution A, after fully emulsifying, increasing the temperature to 60-70° C., turning on condensation and reflux, adding ammonium persulfate dropwise, continuing to stir until the completion of reaction after the completion of dropwise addition, then cooling to room temperature, and discharging after cooling to obtain the polymer microsphere plugging agent.

As a further improvement of the present general inventive concept, the alkali liquor neutralization may include a neutralization by aqueous sodium hydroxide solution, and the neutralization degree may be 50-80%.

As a further improvement of the present general inventive concept, the ammonium persulfate initiator may be dripped in batches with an aqueous solution with a mass concentration of 10%, and the dripping time may be 45-60 min.

As a further improvement of the present general inventive concept, the emulsification conditions may include the stirring speed being 500-600 r/min, and the time being 20-30 min.

As a further improvement of the present general inventive concept, the stirring speed after the dropwise addition of ammonium persulfate may be 200-300 r/min, and the reaction time may be 6-7 h.

As a further improvement of the present general inventive concept, when stirring uniformly to make a solution A, the stirring speed may be 200-300 r/min.

The present general inventive concept may have various advantages over the related art.

The polymer microsphere plugging agent of the present disclosure may use acrylamide and acrylic acid as comonomers, N,N'-methylene bisacrylamide as a crosslinking agent, ammonium persulfate and sodium bisulfite as redox initiators, white oil as the continuous phase, and sorbitan fatty acid ester and hydrophilic surfactants as composite emulsifiers, to synthesize the polymer microspheres with ultra-low interfacial tension by inverse phase emulsion polymerization. The analysis shows that the plugging agent is a salt-tolerant polymer microsphere with ultra-low interfacial tension, the interfacial tension can reach $4.3 \times 10^{-3}$ mN/m, and the salt tolerance can reach 50000 mg/L salinity, which improves the problems of low interfacial tension of microspheres and low salt tolerance of the existing polymer microsphere.

The polymer microsphere plugging agents prepared by the present general inventive concept have simple construction, good stability, ultra-low interfacial tension, and higher salt tolerance, which can simultaneously reach the effect of plugging and oil flooding.

Further, in the formula of the present general inventive concept, sorbitan fatty acid ester and hydrophilic surfactant may be used as composite emulsifiers, which can increase the emulsification effect, speed, and stability of the emulsion.

Further, the water used in the formula of the present general inventive concept may be tap water or deionized water, which can ensure the reaction effect and yield, especially the use of tap water, which effectively simulates the actual production conditions and improves the applicability of the polymer microsphere plugging agent of the present general inventive concept.

Further, in the preparation method of the present general inventive concept, the mass ratio of solution A and solution B may be (1-4):1, in order to ensure the requirements of water-in-oil in the inverse phase emulsion polymerization.

Further, the ammonium persulfate initiator may be added in batches with a concentration of 10% aqueous solution to prevent the reaction from being too violent, to ensure sufficient reaction and high yield.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION OF THE EMBODIMENTS

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 9:
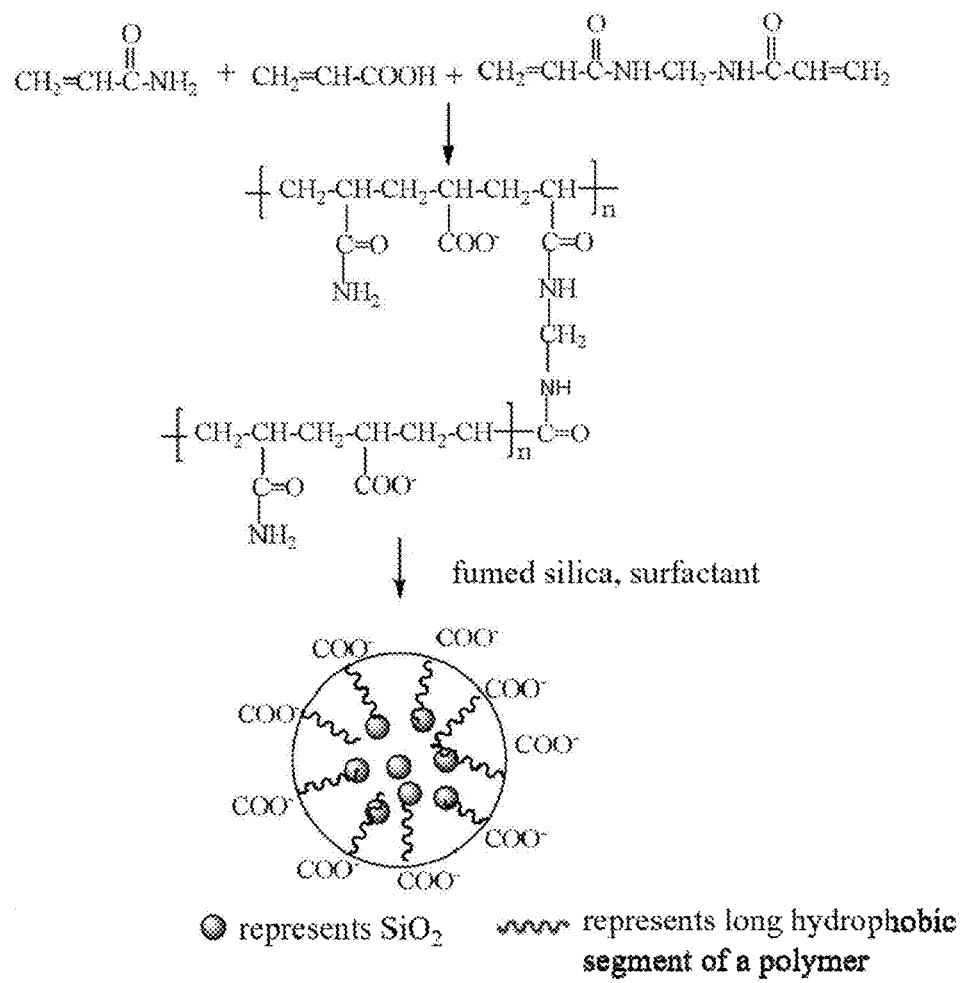
FIG. 9 is a reaction principle diagram of a salt-tolerant polymer microsphere plugging agent, according to an exemplary embodiment of the present general inventive concept.

FIG. 9 is a reaction principle diagram of a salt-tolerant polymer microsphere plugging agent, according to an exemplary embodiment of the present general inventive concept.

As illustrated in FIG. 9, a method of preparing the salt-tolerant polymer microsphere plugging agent may include the following steps, but is not limited thereto:

1) Weighing raw material according to weight ratio.

2) Under room temperature, adding white oil, fumed silica, sorbitan fatty acid ester, the hydrophilic surfactant to a container equipped with a stirrer, a thermometer, and a reflux condenser, and stirring uniformly at a stirring speed of 200-300 r/min to make a solution A.

3) Adding the weighed acrylamide monomer, acrylic acid, N,N'-methylene bisacrylamide into water, stirring to dissolve completely, adding aqueous sodium hydroxide solution to neutralize, the neutralization degree of 50-80%, then adding sodium bisulfite, stirring to dissolve completely to make a solution B, such that the mass ratio of solution A to solution B is (1-4):1.

4) Adding solution B to solution A, the emulsification stirring speed is 500-600 r/min, the time is 20-30 min, then increasing the temperature to 60-70° C., turning on condensation and reflux, adding 10% mass concentration of aqueous ammonium persulfate solution in batches, the dripping time is 45-60 min, and the dripping time is 45-60 min, continuing to stir after the completion of dropwise addition, the stirring speed is 200-300 r/min, and the time to complete the reaction is 6-7 h, then cooling to room temperature, and discharging after cooling to obtain the polymer microsphere plugging agent.

The polymer microsphere plugging agent may include, but is not limited to, 20-40 wt % of white oil, 0.5-2 wt % of fumed silica, 10-25 wt % of an acrylamide monomer, 5-15 wt % of acrylic acid, 5-15 wt % of sorbitan fatty acid ester, 0.03-0.08 wt % of N,N'-methylene bisacrylamide, 0.01-0.05 wt % of ammonium persulfate, 0.01-0.08 wt % of sodium bisulfite, 10-25 wt % of a hydrophilic surfactant, and water in balance.

The hydrophilic surfactant may be selected from one or more of Tween-80, TX-10, OP-10 and SAS60. The sorbitan fatty acid esters may be selected from one or more of Span-40, Span-60 and Span-80. The water may include tap water or deionized water. The white oil may be industrial grade.

Regarding the calculation of the neutralization degree, $y=(M \times 71)/(40 \times m \times c)$, where y is the neutralization degree, M is the mass of sodium hydroxide, 40 is the relative molecular mass of sodium hydroxide, m is the mass of acrylic acid, c is the concentration of acrylic acid, and 71 is the relative molecular mass of acrylic acid.

The present general inventive concept may be further illustrated below in conjunction with specific embodiments.

Figure 1:
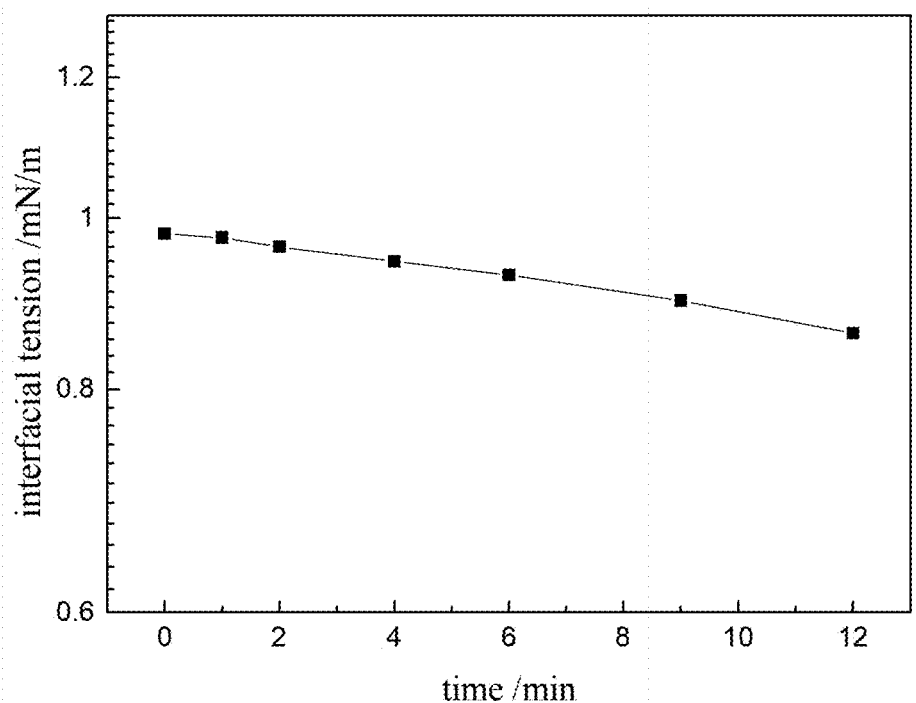
FIG. 1 is an interfacial tension diagram of polymer microspheres as described in Example 1 of the detailed description below, according to an exemplary embodiment of the present general inventive concept.

FIG. 1 is an interfacial tension diagram of polymer microspheres as described in Example 1 of the detailed description below, according to an exemplary embodiment of the present general inventive concept.

Example 1

Referring to FIG. 1, a weight ratio of raw materials utilized in Example 1 were 40 wt % of white oil, 0.5 wt % of fumed silica, 20 wt % of the acrylamide monomer, 5 wt % of acrylic acid, 5 wt % of Span-60, 0.03 wt % of N,N'-methylene bisacrylamide, 0.01 wt % of ammonium persulfate, 0.015 wt % of sodium bisulfite, 10 wt % of Tween-80, and distilled water in balance. The white oil, fumed silica, Span-60, and Tween-80 were placed in a reactor equipped with a stirrer, a reflux condenser, and a thermometer, the resulting mixture was stirred uniformly at a speed of 200 r/min to obtain a solution A. Subsequently, the monomer acrylamide was dissolved with water in a beaker, then acrylic acid and N,N'-methylene bisacrylamide were added, and the resulting system was stirred evenly on the magnetic stirrer. After the complete dissolution, the aqueous sodium hydroxide solution was added to neutralize, the neutralization degree was 50%, and sodium bisulfite was added to completely dissolve to make a solution B. Then the solution B was slowly added to the solution A, and the resulting system was emulsified and mixed at 500 r/min for 20 min. After the emulsion was completed, the temperature was increased to 60° C., ammonium persulfate was prepared into a 10 wt % aqueous solution and added slowly in batches, and the dripping was completed within 1 h. After the dripping of initiator was completed, the resulting system was stirred and reacted at 200 r/min for another 6 h, and then cooled for discharging. The obtained polymer microspheres were placed in 7 days without stratification, and the interfacial tension diagram is illustrated in FIG. 1, when the salinity is 30000 mg/L and the microsphere concentration is 0.5%, the interfacial tension is $8.6 \times 10^{-1}$ mN/m.

Figure 2:
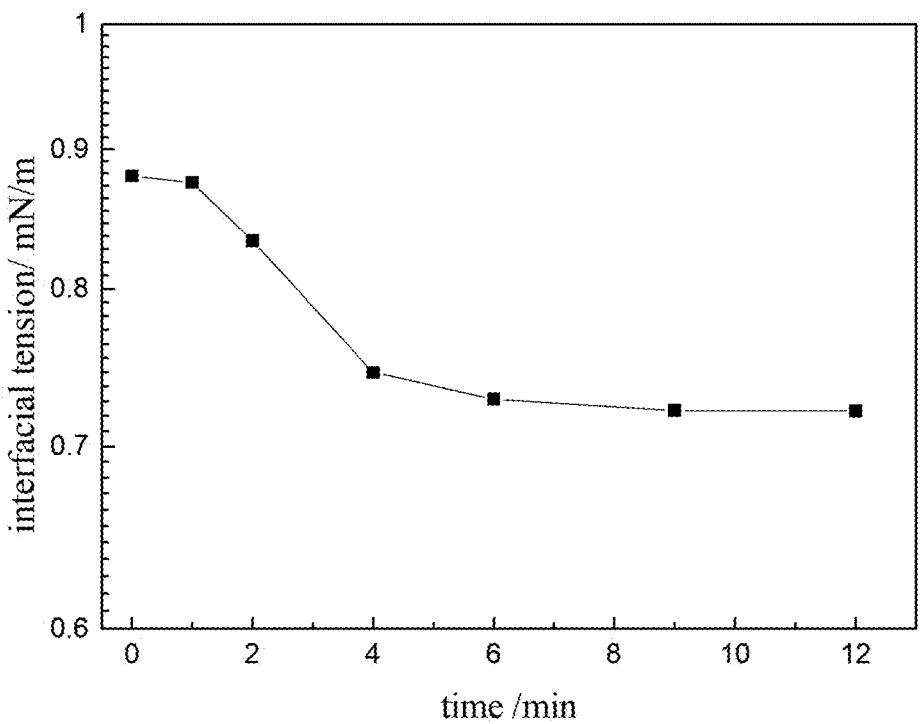
FIG. 2 is an interfacial tension diagram of polymer microspheres as described in Example 2 of the detailed description below, according to an exemplary embodiment of the present general inventive concept.

FIG. 2 is an interfacial tension diagram of polymer microspheres as described in Example 2 of the detailed description below, according to an exemplary embodiment of the present general inventive concept.

Example 2

Referring to FIG. 2, a weight ratio of raw materials utilized in Examiner 2 were 20 wt % of white oil, 1.1 wt % of fumed silica, 25 wt % of the acrylamide monomer, 10 wt % of acrylic acid, 10 wt % of Span-40, 0.08 wt % of N,N'-methylene bisacrylamide, 0.05 wt % of ammonium persulfate, 0.08 wt % of sodium bisulfite, 25 wt % of OP-10, and tap water in balance. The white oil, fumed silica, Span-40, and OP-10 were placed in a reactor equipped with a stirrer, a reflux condenser, and a thermometer, the resulting mixture was stirred uniformly at a speed of 300 r/min to obtain a solution A; the monomer acrylamide was dissolved with water in a beaker, then acrylic acid and N,N'-methylene bisacrylamide were added, and the resulting system was stirred evenly on the magnetic stirrer. After the complete dissolution, the aqueous sodium hydroxide solution was added to neutralize, the neutralization degree was 60%, and sodium bisulfite was added to completely dissolve to make a solution B. Then the solution B was slowly added to the solution A, and the resulting system was emulsified and mixed at 600 r/min for 25 min. After the emulsion was completed, the temperature was increased to 65° C., ammonium persulfate was prepared into a 10 wt % aqueous solution and added slowly in batches. After the dripping of initiator was completed, the resulting system was stirred and reacted at 300 r/min for another 6 h, and then cooled for discharging. The obtained polymer microspheres were placed in 24 h without stratification, and the interfacial tension diagram is shown in FIG. 2, when the salinity is 30000 mg/L and the microsphere concentration is 0.5%, the interfacial tension is $7.2 \times 10^{-1}$ mN/m.

Figure 3:
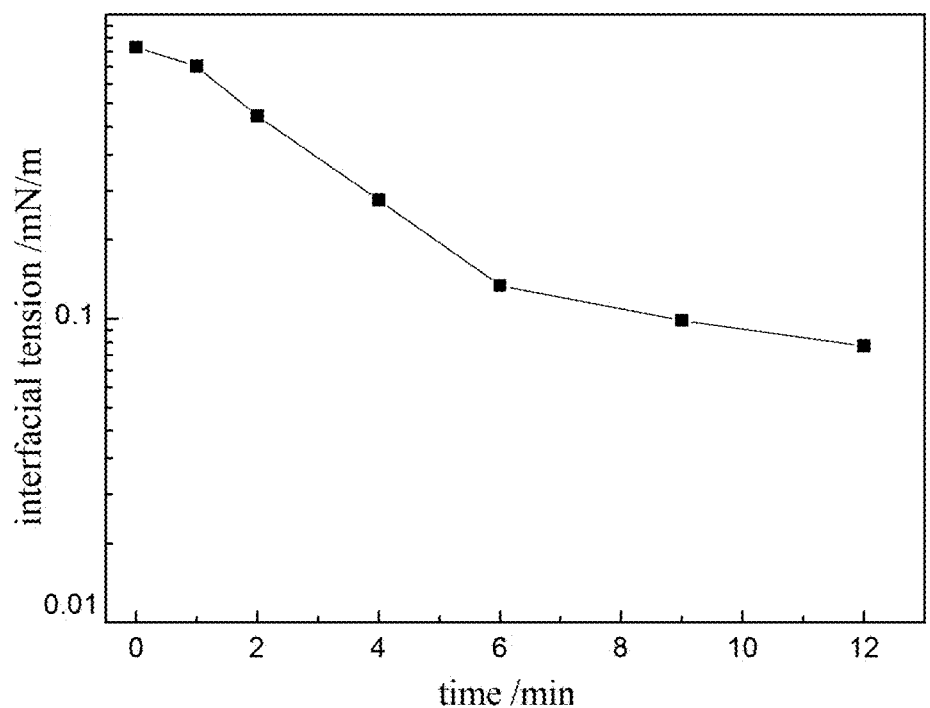
FIG. 3 is an interfacial tension diagram of the polymer microspheres as described in Example 3 of the detailed description below, according to an exemplary embodiment of the present general inventive concept.

FIG. 3 is an interfacial tension diagram of the polymer microspheres as described in Example 3 of the detailed description below, according to an exemplary embodiment of the present general inventive concept;

Example 3

Referring to FIG. 3, a weight ratio of raw materials utilized in Examiner 3 were 38 wt % of white oil, 1.6 wt % of fumed silica, 15 wt % of the acrylamide monomer, 15 wt % of acrylic acid, 8 wt % of Span-80, 0.04 wt % of N,N'-methylene bisacrylamide, 0.02 wt % of ammonium persulfate, 0.05 wt % of sodium bisulfite, 12 wt % of TX-10, and tap water in balance. The white oil, fumed silica, Span-80, and TX-10 were placed in a reactor equipped with a stirrer, a reflux condenser, and a thermometer, the resulting mixture was stirred uniformly at a speed of 200 r/min to obtain a solution A. Subsequently, the monomer acrylamide was dissolved with water in a beaker, then acrylic acid and N,N'-methylene bisacrylamide were added, and the resulting system was stirred evenly on the magnetic stirrer. After the complete dissolution, the aqueous sodium hydroxide solution was added to neutralize, the neutralization degree was 65%, and sodium bisulfite was added to completely dissolve to make a solution B. Then the solution B was slowly added to the solution A, and the resulting system was emulsified at 500 r/min for 30 min. After the emulsion was completed, the temperature was increased to 65° C., ammonium persulfate was prepared into a 10 wt % aqueous solution and added slowly in batches, and the dripping was completed within 45 min. After the dripping of initiator was completed, the resulting system was stirred and reacted at 200 r/min for another 7 h, and then cooled for discharging. The obtained polymer microspheres were placed in 30 days without stratification, and the interfacial tension diagram is illustrated in FIG. 3, when the salinity is 30000 mg/L and the microsphere concentration is 0.5%, the interfacial tension is $8.1 \times 10^{-2}$ mN/m.

Figure 4:
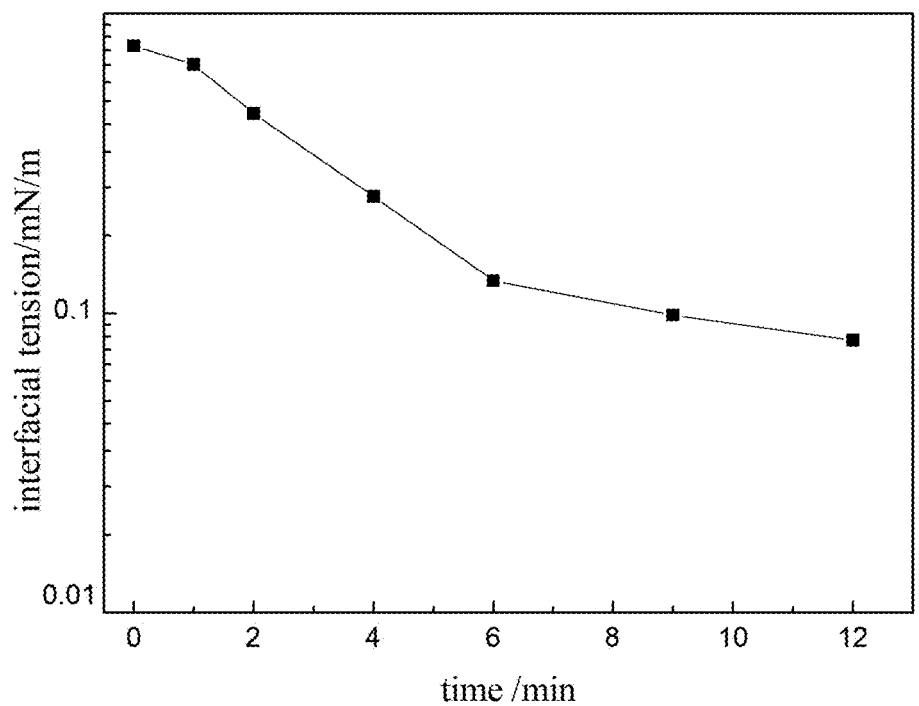
FIG. 4 is an interfacial tension diagram of polymer microspheres as described in Example 4 of the detailed description below, according to an exemplary embodiment of the present general inventive concept.

FIG. 4 is an interfacial tension diagram of polymer microspheres as described in Example 4 of the detailed description below, according to an exemplary embodiment of the present general inventive concept.

Example 4

Referring to FIG. 4, a weight ratio of raw materials utilized in Examiner 4 were 30 wt % of white oil, 2 wt % of fumed silica, 10 wt % of the acrylamide monomer, 12 wt % of acrylic acid, 15 wt % of Span-60, 0.04 wt % of N,N'-methylene bisacrylamide, 0.015 wt % of ammonium persulfate, 0.03 wt % of sodium bisulfite, 9 wt % of TX-10, 3 wt % of Tween-80, and tap water in balance. The white oil, fumed silica, Span-60, TX-10 and Tween-80 were placed in a reactor equipped with a stirrer, a reflux condenser, and a thermometer, the resulting mixture was stirred uniformly at a speed of 200 r/min to obtain a solution A. Subsequently, the monomer acrylamide was dissolved with water in a beaker, then acrylic acid and N,N'-methylene bisacrylamide were added, and the resulting system was stirred evenly on the magnetic stirrer. After the complete dissolution, the aqueous sodium hydroxide solution was added to neutralize, the neutralization degree was 70%, and sodium bisulfite was added to completely dissolve to make a solution B. Then the solution B was slowly added to the solution A, and the resulting system was emulsified at 600 r/min for 30 min. After the emulsion was completed, the temperature was increased to 70° C., ammonium persulfate was prepared into a 10 wt % aqueous solution and added slowly in batches. After the dripping of initiator was completed, the resulting system was stirred and reacted at 300 r/min for another 7 h, and then cooled for discharging. The obtained polymer microspheres were placed in 30 days without stratification, and the interfacial tension diagram is illustrated in FIG. 4, when the salinity is 30000 mg/L and the microsphere concentration is 0.5%, the interfacial tension is $2.9 \times 10^{-2}$ mN/m.

Figure 5:
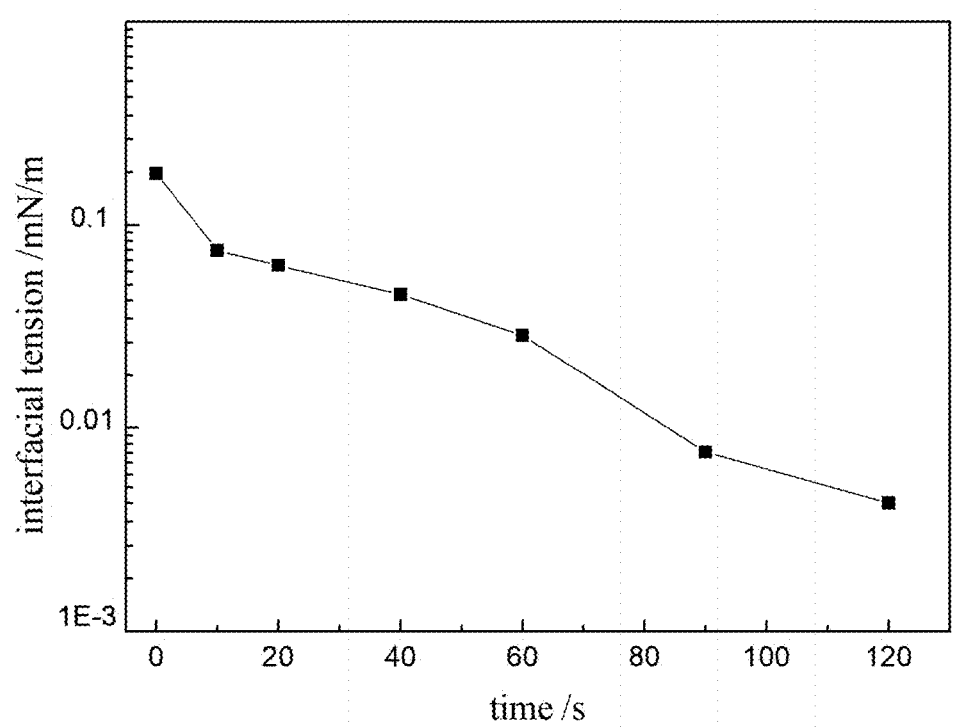
FIG. 5 is an interfacial tension diagram of polymer microspheres as described in Example 5 of the detailed description below, according to an exemplary embodiment of the present general inventive concept.

FIG. 5 is an interfacial tension diagram of polymer microspheres as described in Example 5 of the detailed description below, according to an exemplary embodiment of the present general inventive concept.

Figure 6:
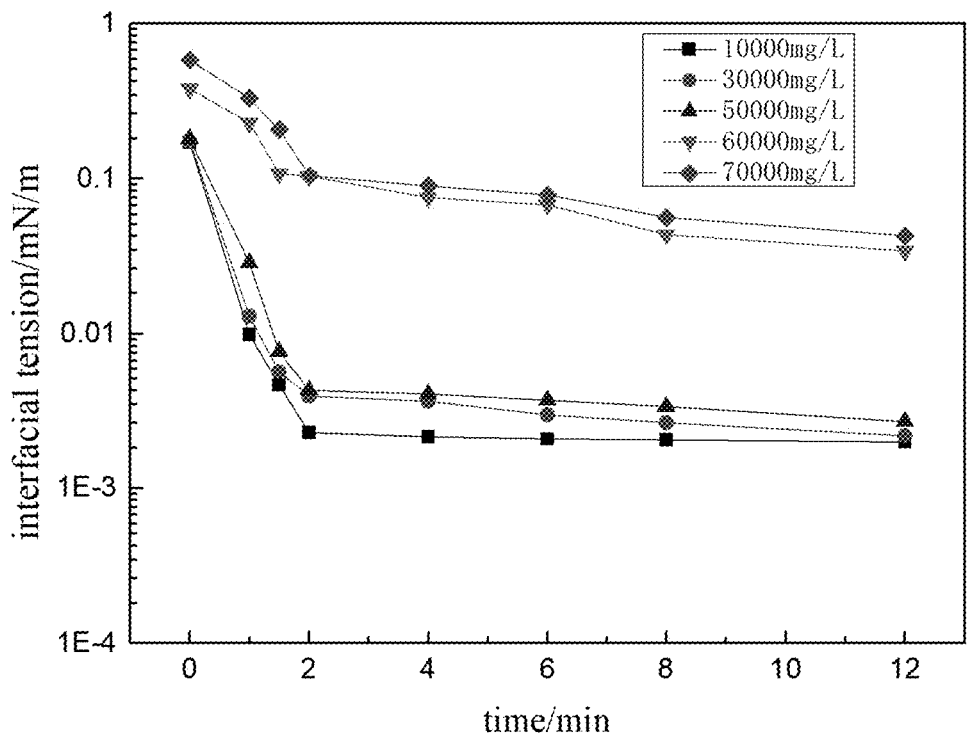
FIG. 6 is a salt-tolerant analysis diagram of the polymer microspheres of Example 5 of the detailed description below, according to an exemplary embodiment of the present general inventive concept.

FIG. 6 is a salt-tolerant analysis diagram of the polymer microspheres of Example 5 of the detailed description below, according to an exemplary embodiment of the present general inventive concept.

Figure 7:
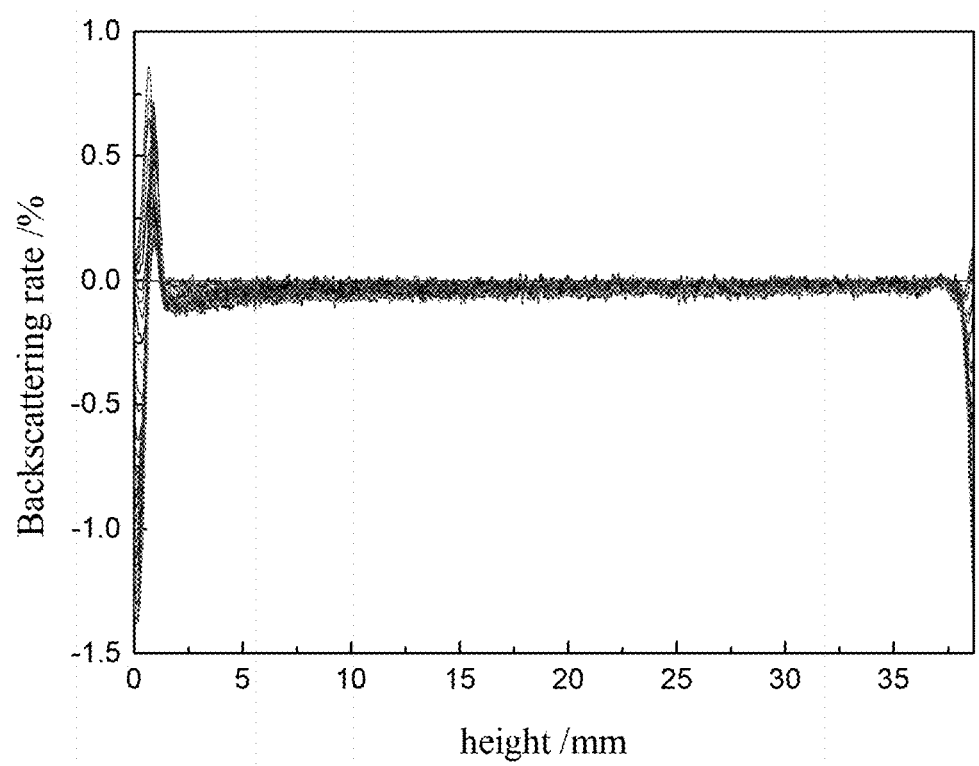
FIG. 7 is a stability analysis diagram of the polymer microspheres as described in Example 5 of the detailed description below, after being placed for 15 days, according to an exemplary embodiment of the present general inventive concept.

FIG. 7 is a stability analysis diagram of the polymer microspheres as described in Example 5 of the detailed description below, after being placed for 15 days, according to an exemplary embodiment of the present general inventive concept.

Figure 8:
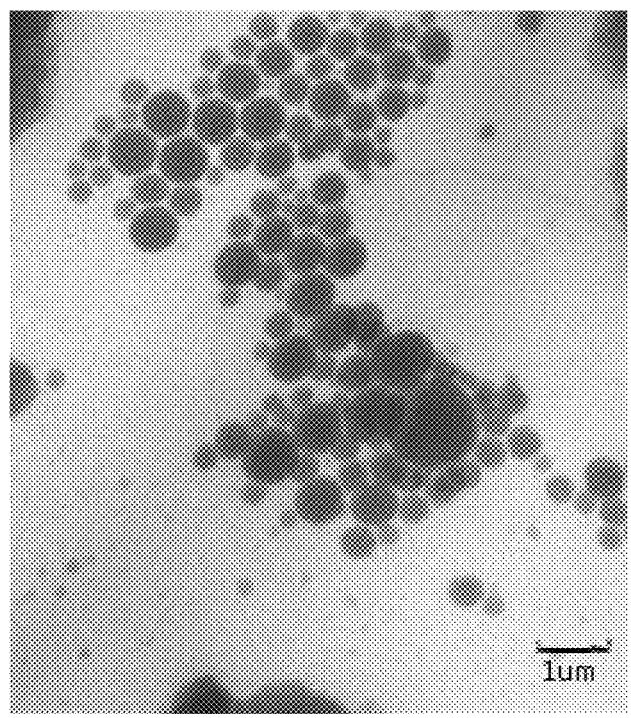
FIG. 8 is a transmission electron micrograph of the polymer microspheres as described in Example 5 of the detailed description below, according to an exemplary embodiment of the present general inventive concept.

FIG. 8 is a transmission electron micrograph of the polymer microspheres as described in Example 5 of the detailed description below, according to an exemplary embodiment of the present general inventive concept.

Example 5

Referring to FIGS. 5 through 8, a weight ratio of raw materials utilized in Example 5 were 30 wt % of white oil, 1.9 wt % of fumed silica, 18 wt % of the acrylamide monomer, 5 wt % of acrylic acid, 4 wt % of Span-60, 3 wt % of Span-80, 0.04 wt % of N,N'-methylene bisacrylamide, 0.05 wt % of ammonium persulfate, 0.03 wt % of sodium bisulfite, 9 wt % of OP-10, 3 wt % of SAS60, and tap water in balance. The white oil, fumed silica, Span-60, Span-80, OP-10 and SAS60 were placed in a reactor equipped with a stirrer, a reflux condenser, and a thermometer, the resulting mixture was stirred uniformly at a speed of 300 r/min to obtain a solution A. Subsequently, the monomer acrylamide was dissolved with water in a beaker, then acrylic acid and N,N'-methylene bisacrylamide were added, and the resulting system was stirred evenly on the magnetic stirrer. After the complete dissolution, the aqueous sodium hydroxide solution was added to neutralize, the neutralization degree was 75%, and sodium bisulfite was added to completely dissolve to make a solution B. Then the solution B was slowly added to the solution A, and the resulting system was emulsified at 600 r/min for 30 min. After the emulsion was completed, the temperature was increased to 70° C., ammonium persulfate was prepared into a 10 wt % aqueous solution and added slowly in batches, and the dripping was completed within 1 h. After the dripping of initiator was completed, the resulting system was reacted for another 6 h, and then cooled for discharging.

The obtained polymer microspheres were placed in 30 days without stratification, and the interfacial tension diagram is illustrated in FIG. 5, when the salinity is 30000 mg/L and the microsphere concentration is 0.5%, the interfacial tension is $4.3 \times 10^{-3}$ mN/m. It can be seen from FIG. 6 that when the salinity is 50000 mg/L, it still has ultra-low interfacial tension, indicating that it has good salt tolerance. FIG. 7 is the stability analysis diagram of the polymer microspheres after being placed for 15 days, and by observing the light scattering rate, it can be seen that compared with the first baseline, the rest of the curves basically coincide with the first baseline. As the test time increases, the microspheres with large particle diameters gradually sink, so the light scattering rate increases at 1 mm at the bottom of the bottle, and the overall stability is very good. It can be seen from the transmission electron microscope image of the polymer microspheres in FIG. 8 that the microsphere latex particles have a regular spherical structure and the particle size distribution is relatively uniform.

Example 6

Example 6 includes a utilization of the method of preparing the salt-tolerant polymer microsphere plugging including the following specific steps, procedures, weights, measurements, ratios, percentages, and speeds:

1) The raw materials were weighed according to weight ratio.

2) Under room temperature, white oil, fumed silica, sorbitan fatty acid ester, and the hydrophilic surfactant were added to a container equipped with a stirrer, a thermometer, and a reflux condenser, and stirred uniformly at a stirring speed of 200 r/min to make a solution A.

3) The weighed acrylamide monomer, acrylic acid, and N,N'-methylene bisacrylamide were added into water, stirred to dissolve completely, aqueous sodium hydroxide solution was added to neutralize, the neutralization degree was 50%, then sodium bisulfite was added, stirred to dissolve completely to make a solution B; and the mass ratio of solution A to solution B was 1:1.

4) The solution B was added to solution A, the emulsification stirring speed was 500-600 r/min, the time was 20-30 min, then the temperature was increased to 60° C., condensation and reflux were turned on, 10% mass concentration of aqueous ammonium persulfate solution was added dropwise in batches, the dripping time was 45 min, and the dripping time was 45 min. After the completion of dropwise addition, the stirring was continued, the stirring speed was 200 r/min, and the time to complete the reaction was 6 h. Subsequently, the temperature was cooled to room temperature, and it was discharged after cooling to obtain the polymer microsphere plugging agent.

In Example 6, the polymer microsphere plugging agent included 20 wt % of white oil, 0.5 wt % of fumed silica, 10 wt % of an acrylamide monomer, 5 wt % of acrylic acid, 15 wt % of sorbitan fatty acid ester, 0.08 wt % of N,N'-methylene bisacrylamide, 0.05 wt % of ammonium persulfate, 0.08 wt % of sodium bisulfite, 25 wt % of a hydrophilic surfactant, and water in balance.

Example 7

Example 7 includes another utilization of the method of preparing the salt-tolerant polymer microsphere plugging including the following specific steps, procedures, weights, measurements, ratios, percentages, and speeds:

1) The raw materials were weighed according to weight ratio.

2) Under room temperature, white oil, fumed silica, sorbitan fatty acid ester, and the hydrophilic surfactant were added to a container equipped with a stirrer, a thermometer, and a reflux condenser, and stirred uniformly at a stirring speed of 300 r/min to make a solution A.

3) The weighed acrylamide monomer, acrylic acid, and N,N'-methylene bisacrylamide were added into water, stirred to dissolve completely, aqueous sodium hydroxide solution was added to neutralize, the neutralization degree was 80%, then sodium bisulfite was added, stirred to dissolve completely to make a solution B; and the mass ratio of solution A to solution B was 4:1.

4) The solution B was added to solution A, the emulsification stirring speed was 600 r/min, the time was 30 min, then the temperature was increased to 60-70° C., condensation and reflux were turned on, 10% mass concentration of aqueous ammonium persulfate solution was added dropwise in batches, the dripping time was 60 min, and the dripping time was 60 min. After the completion of dropwise addition, the stirring was continued, the stirring speed was 300 r/min, and the time to complete the reaction was 7 h. Subsequently, the temperature was cooled to room temperature, and it was discharged after cooling to obtain the polymer microsphere plugging agent.

In Example 7, the polymer microsphere plugging agent included 40 wt % of white oil, 2 wt % of fumed silica, 25 wt % of an acrylamide monomer, 5 wt % of acrylic acid, 5 wt % of sorbitan fatty acid ester, 0.03 wt % of N,N'-methylene bisacrylamide, 0.01 wt % of ammonium persulfate, 0.01 wt % of sodium bisulfite, 10 wt % of a hydrophilic surfactant, and water in balance.

It is important to note that slight variations in the above steps, procedures, weights, measurements, ratios, percentages, and speeds may produce slightly different weight percentages with regard to the polymer microsphere plugging agent.

Compared with related art, the polymer microspheres of the present general inventive concept have two-dimensional effects of plugging and oil flooding, the plugging rate can reach more than 75%, the oil flooding rate can reach more than 90%, the minimum interfacial tension is $4.3 \times 10^{-3}$ mN/m, the maximum salt tolerance is 50000 mg/L salinity, the salt tolerance of ordinary polymer microspheres can only reach 30000 mg/L salinity, and there is no oil flooding effect.

Despite the detailed description and description of the specific examples of the present disclosure, it should be noted that we can make various changes and modifications to the above embodiments, but these are not departed from the scope of the appended claims.

What is claimed is:

1. A salt-tolerant polymer microsphere plugging agent prepared from raw materials in various percentages by weight, comprising:
   20-40 wt % of white oil, 0.5-2 wt % of fumed silica, 10-25 wt % of an acrylamide monomer, 5-15 wt % of acrylic acid, 5-15 wt % of sorbitan fatty acid ester, 0.03-0.08 wt % of N,N'-methylene bisacrylamide, 0.01-0.05 wt % of ammonium persulfate, 0.01-0.08 wt % of sodium bisulfite, 10-25 wt % of a hydrophilic surfactant, and water in balance.

2. The salt-tolerant polymer microsphere plugging agent according to claim 1, wherein the hydrophilic surfactant is one or more of polyethylene glycol sorbitan monooleate, alkylphenol ethoxylates, polyethylene glycol alkylphenyl ether and sodium alkylbenzene sulfonate.

3. The salt-tolerant polymer microsphere plugging agent according to claim 1, wherein the sorbitan fatty acid ester is one or more of sorbitan monopalmitate, sorbitan monstearate and sorbitan oleate.

4. The salt-tolerant polymer microsphere plugging agent according to claim 1, wherein the water is tap water or deionized water.

5. A method of preparing the salt-tolerant polymer microsphere plugging agent of claim 1, the method comprising:
   under room temperature, adding white oil, fumed silica, sorbitan fatty acid ester, hydrophilic surfactant, and stirring uniformly to make a solution A;

adding an acrylamide monomer, acrylic acid, N,N'-methylene bisacrylamide into water, stirring to dissolve completely, adding an alkali liquor to neutralize, then adding sodium bisulfite, stirring to dissolve completely to make a solution B, such that a mass ratio of solution A to solution B is (1-4):1; and adding solution B to solution A, after fully emulsifying, increasing the temperature to 60-70° C., turning on condensation and reflux, adding ammonium persulfate dropwise, continuing to stir until the completion of reaction after the completion of dropwise addition, then cooling to room temperature, and discharging after cooling to obtain the polymer microsphere plugging agent.

* * * * *